US008842073B2

(12) United States Patent
Gan et al.

(10) Patent No.: US 8,842,073 B2
(45) Date of Patent: Sep. 23, 2014

(54) KEYBOARD, METHOD OF DRIVING AND ASSEMBLING THE SAME, AND ELECTRONIC DEVICE

(71) Applicants: Lenovo (Beijing) Co., Ltd., Beijing (CN); Beijing Lenovo Software Ltd., Beijing (CN)

(72) Inventors: Dayong Gan, Beijing (CN); Guangjun Jiang, Beijing (CN)

(73) Assignees: Lenovo (Beijing) Co., Ltd., Beijing (CN); Beijing Lenovo Software Ltd., Beijing (CN)

( * ) Notice: Subject to any disclaimer, the term of this patent is extended or adjusted under 35 U.S.C. 154(b) by 110 days.

(21) Appl. No.: 13/719,475

(22) Filed: Dec. 19, 2012

(65) Prior Publication Data

US 2013/0154940 A1     Jun. 20, 2013

(30) Foreign Application Priority Data

Dec. 19, 2011   (CN) .......................... 2011 1 0427870
Feb. 10, 2012   (CN) .......................... 2012 1 0030586

(51) Int. Cl.
| | |
|---|---|
| G09G 5/00 | (2006.01) |
| G06F 3/02 | (2006.01) |
| G06F 1/16 | (2006.01) |
| H01H 13/70 | (2006.01) |
| H01H 36/00 | (2006.01) |
| H01H 13/85 | (2006.01) |
| H01H 3/12 | (2006.01) |

(52) U.S. Cl.
CPC ........... *H01H 13/70* (2013.01); *H01H 2221/04* (2013.01); *G06F 1/1618* (2013.01); *G06F 3/02* (2013.01); *H01H 3/125* (2013.01); *H01H 36/0073* (2013.01); *H01H 13/85* (2013.01); *G06F 1/1666* (2013.01)
USPC .......................................................... 345/168

(58) Field of Classification Search
CPC ..................................... G09G 5/00; G06F 3/02
USPC .......................................... 345/168; 200/344
See application file for complete search history.

(56) References Cited

U.S. PATENT DOCUMENTS

| | | | | |
|---|---|---|---|---|
| 7,449,651 | B2 * | 11/2008 | Lin | 200/344 |
| 8,030,585 | B2 * | 10/2011 | Wang | 200/344 |
| 8,576,034 | B2 * | 11/2013 | Bilbrey et al. | 335/285 |
| 2012/0021619 | A1 * | 1/2012 | Bilbrey et al. | 439/39 |
| 2012/0023597 | A1 * | 1/2012 | Bilbrey et al. | 726/30 |
| 2013/0335327 | A1 * | 12/2013 | Solomon et al. | 345/168 |

* cited by examiner

*Primary Examiner* — Fred Tzeng
(74) *Attorney, Agent, or Firm* — Brinks Gilson & Lione; G. Peter Nichols

(57) ABSTRACT

A keyboard, a driving method and an assembling method for the keyboard, and an electronic device are described. The keyboard includes a base plate, on which a first magnetic member and a second magnetic member are formed; a keycap, disposed above the base plate; and an X-shaped holder disposed between the base plate and the keycap for supporting the keycap, and a third permanent magnet is provided on the sliding end, wherein the keycap is movable between a first position and a second position lower than the first position along a direction substantially perpendicular to the base plate, and wherein the third permanent magnet is in a position substantially opposite to the second magnetic member when the keycap is in the first position, and the third permanent magnet slides to a position substantially opposite to the first magnetic member when the keycap is in the second position.

22 Claims, 6 Drawing Sheets

US 8,842,073 B2

KEYBOARD, METHOD OF DRIVING AND ASSEMBLING THE SAME, AND ELECTRONIC DEVICE

This application claims priority to Chinese patent application No. 201110427870.3 filed Dec. 19, 2011 and Chinese patent application No. 201210030586.7 filed Feb. 10, 2012, the entire contents of which is incorporated herein by reference.

BACKGROUND OF THE INVENTION

The present invention relates to the field of electronics, and more particularly to a keyboard, a driving method and an assembling method for the keyboard, and an electronic device.

The conventional keyboard comprises keycaps and soft rubber pads supporting the key caps. When a user presses a key, the rubber pad is compressed and the keycap is depressed; when the user releases the key, the rubber pad pushes the keycap back to the initial position.

The soft rubber pad is generally designed to have a tower shape, which is pressed by different distances with different key-press forces. As shown in FIG. 1, the X axis represents for the key-press stroke and the Y axis for the key-press force. At the beginning of pressing, greater key-press forces are required; in the middle of the stroke of the keycap, the key-press forces gradually reduce; and the key-press forces rapidly increase when the keycap reaches its lowest position, where the user may sense the completion of the press action thus releases the pressing finger. The soft rubber pad is widely used for its low cost and pleasant touch feels, but is prone to aging. Over an extended period of time, the texture of the rubber is likely to change, leading to a poor hand feeling or even such that it may not be used any more.

A magnetic keyboard, which comprises two magnets with ends having the same polarity opposing each other and supports the keycap by the mutual repulsiveness between the magnets, has been proposed to prolong the service life of the keyboard greatly. However, the magnetic keyboard lacks good hand feel while being used. FIG. 1 also shows the change of the key-press force (Y axis) along with the key-press stroke (X axis) when the magnetic keyboard is used. As shown in FIG. 1, the key-press force increases monotonously with the key-press stroke, causing hard hand feel, far less pleasant than that of the soft rubber pad keyboard. That explains why the magnetic keyboard is not widely used.

On the other hand, the rapid development of the portable electronic devices brings new challenge to the volume and the hand feel of the keyboard, which is desired to become thinner, smaller and better to touch.

Normally, the stacked thickness of keyboard hinders the development of a smaller and thinner electronic device. Even if each component of the existing keyboard is made to be extremely thin, the height of the keyboard may not be dramatically changed due to the thickness limitation of the material. Furthermore, the ultrathin materials for the components of the keyboard also affect the hand feel of the keyboard.

Therefore, it is desired to provide a new keyboard design which can provide prolonged service life and good hand feel.

In addition, it is also desired to provide a thin keyboard with good touch feel.

SUMMARY OF THE INVENTION

One aspect of the present invention provides a keyboard, a driving method and an assembling method for the keyboard, and an electronic device with a prolonged service life and good hand feel.

Another aspect of the present invention provides a keyboard, a driving method and an assembling method for the keyboard, and an electronic device with a thinner thickness.

According to the first embodiment of the present invention, a magnetic keyboard is provided, comprising: a base plate, on which a first magnetic member and a second magnetic member are formed; a keycap, disposed above the base plate; and an X-shaped holder disposed between the base plate and the keycap for supporting the keycap, the X-shaped holder comprising a first lever and a second lever pivotally connected to each other, thus having four ends, wherein one end is pivotally connected to the base plate, one end is slidably connected to the keycap in a sliding direction substantially parallel to the base plate, and a third permanent magnet is provided on the sliding end, wherein the keycap is movable between a first position and a second position lower than the first position along a direction substantially perpendicular to the base plate, and wherein the third permanent magnet is in a position substantially opposite to the second magnetic member when the keycap is in the first position, and the third permanent magnet slides to a position substantially opposite to the first magnetic member when the keycap is in the second position.

In the magnetic keyboard, the first magnetic member and the second magnetic member may respectively be a first permanent magnet and a second permanent magnet, and a lower surface of the third permanent magnet has the same polarity as those of the upper surfaces of the first permanent magnet and the second permanent magnet.

In the magnetic keyboard, the first magnetic member and the second magnetic member may respectively be a first electromagnet and a second electromagnet.

In the magnetic keyboard, the first magnetic member and the second magnetic member may respectively be a first electromagnet and a second permanent magnet, and the lower surface of the third permanent magnet has the same polarity as that of the upper surface of the second permanent magnet.

In the magnetic keyboard, a first chute may be formed on the keycap, in which the sliding end of the X-shaped holder is fitted.

In the magnetic keyboard, a contact pole towards the base plate may be formed on the keycap, a circuit may be formed on the base plate, and the contact pole contacts the circuit when the keycap is in the second position such that the circuit sends a key value while supplying power to the first electromagnet.

According to another embodiment of the present invention, a magnetic keyboard is provided, comprising: a base plate; a keycap, disposed above the base plate and having a first permanent magnet and a second permanent magnet; and an X-shaped holder disposed between the base plate and the keycap for supporting the keycap, the X-shaped holder comprising a first lever and a second lever pivotally connected to each other, thus having four ends, wherein one end is pivotally connected to the base plate, one end is slidably connected to the base plate in a sliding direction substantially parallel to the base plate, and a third permanent magnet is provided on the sliding end, the upper surface of the third permanent magnet having the same polarity as those of the lower surfaces of the first permanent magnet and the second permanent magnet, wherein the keycap is movable between a first position and a second position lower than the first position along a direction substantially perpendicular to the base plate, and wherein the third permanent magnet is in a position substantially opposite to the second permanent magnet when the keycap is in the first position, and the third permanent magnet slides to a position substantially opposite to the first permanent magnet when the keycap is in the second position.

According to another embodiment of the present invention, a driving method for a magnetic keyboard is provided, which magnetic keyboard comprises a base plate, a keycap, and an X-shaped holder supporting the keycap on the base plate, one end of the X-shaped holder being slidably connected to the keycap, a first electromagnet and a second magnetic member being provided on the base plate, a third permanent magnet being provided on the sliding end of the X-shaped holder and sliding from a position substantially opposite to the second magnetic member to a position substantially opposite to the first electromagnet in response to the depressing operation of the keycap, the driving method comprising: sending a key value when the keycap is pressed to the lowest position, and at the same time applying a current pulse to the first electromagnet so as to generate a repulsive magnetic force between the first electromagnet and the third permanent magnet.

The driving method may further comprise: applying a current pulse to the first electromagnet when the magnetic keyboard is actuated, such that the first electromagnet generates a repulsive magnetic force against the third permanent magnet.

In the driving method, the second magnetic member may be a second electromagnet, and the driving method may further comprise: powering the second electromagnet when the magnetic keyboard is actuated so as to generate a repulsive magnetic force against the third permanent magnet.

The driving method may further comprise: applying a reverse current pulse to the first and the second electromagnets when the magnetic keyboard is shut down, such that the keycap is disposed at the lowest position by the attractive magnetic force.

In the driving method, the second magnetic member is a second permanent magnet and is arranged to generate a repulsive magnetic force against the third permanent magnet.

According to another embodiment of the present invention, an electronic device is provided, comprising: a keyboard, sending a key value in response to a key-press operation; a processing unit, receiving and handling the key value sent by the keyboard; and a display unit, displaying a processed result of the processing unit, wherein the keyboard comprises: a base plate, on which a first magnetic member and a second magnetic member are formed; a keycap, disposed above the base plate; and an X-shaped holder disposed between the base plate and the keycap for supporting the keycap, the X-shaped holder comprising a first lever and a second lever pivotally connected to each other, thus having four ends, wherein one end is pivotally connected to the base plate, one end may be slidably connected to the keycap in a sliding direction substantially parallel to the base plate, and a third permanent magnet is provided on the sliding end, wherein the keycap is movable between a first position and a second position lower than the first position along a direction substantially perpendicular to the base plate, and wherein the third permanent magnet is in a position substantially opposite to the second magnetic member when the keycap is in the first position, and the third permanent magnet slides to a position substantially opposite to the first magnetic member when the keycap is in the second position.

According to another embodiment of the present invention, a keyboard is provided, comprising: a keycap; an X-shaped holder for supporting the keycap, the X-shaped holder at least comprising a first member at least having a first pivoting part and a second member at least having a second pivoting part; a movable means connected to the first pivoting part; and a fixed means connected to the second pivoting part, wherein the movable means moves to bring the first pivoting part away from or towards the second pivoting part.

In the keyboard, the movable means may be interlinked with the movement of a screen of the electronic device, so that the first pivoting part moves away from or towards the second pivoting part when the screen moves.

In the keyboard, the first pivoting part may move towards the second pivoting part when the screen moves away from the keyboard; and the first pivoting part may move away from the second pivoting part when the screen moves towards the keyboard.

In the keyboard, when the first pivoting part moves away from the second pivoting part, the keycap may be depressed so that the keyboard enters into a compression state; and when the first pivoting part moves towards the second pivoting part, the keycap may be moved upwards so that the keyboard is in an operable readiness state.

In the keyboard, the fixed means may be a fixed plate, and the movable means may be a movable plate located above or below the fixed plate, wherein the upper one of the fixed plate and the movable plate is shorter than the lower one or has an opening so as to allow the lower one to be connected to the corresponding first pivoting part or second pivoting part.

In the keyboard, the fixed means may comprise an accommodating groove, in which the movable means moves.

In the keyboard, the X-shaped holder may comprise a pivot, wherein the pivot moves or the first member or the second member of the X-shaped holder moves with respect to the keycap correspondingly when the movable means moves.

According to another embodiment of the present invention, an assembling method of a keyboard is provided, the keyboard comprising: a keycap; an X-shaped holder at least comprising a first member and a second member; a movable means; and a fixed means, wherein the first member at least has a first pivoting part, the second member at least has a second pivoting part, the method comprising: supportively connecting the X-shaped holder to the keycap; connecting the movable means to the first pivoting part; connecting the fixed means to the second pivoting part; wherein the movable means moves to bring the first pivoting part away from or towards the second pivoting part.

In the assembling method, the fixed means may comprise an accommodating groove, and the assembling method further comprises allowing the movable means to move in the accommodating groove.

With the keyboard, the driving and assembling methods of the keyboard, and the electronic device according to the embodiments of the present invention, the keyboard may have a thinner thickness, a prolonged service life and good hand feel.

BRIEF DESCRIPTION OF THE DRAWINGS

The above and other features and advantages of the invention will become apparent from the following description of the exemplary embodiments with reference to the drawings, in which.

DETAILED DESCRIPTION

The present invention will be described hereinafter by way of example with reference to the accompanying drawings. The invention may, however, be embodied in many different forms and shall not be construed as being limited to the embodiment set forth herein. The embodiments are provided so that this disclosure will be thorough and complete, and fully convey the scope of the invention to those skilled in the art. The embodiments are merely illustrative and are not intended to limit the present invention in any manner. The accompanying drawings display the examples of the embodiments and are not drawn by scale.

Figure 2:
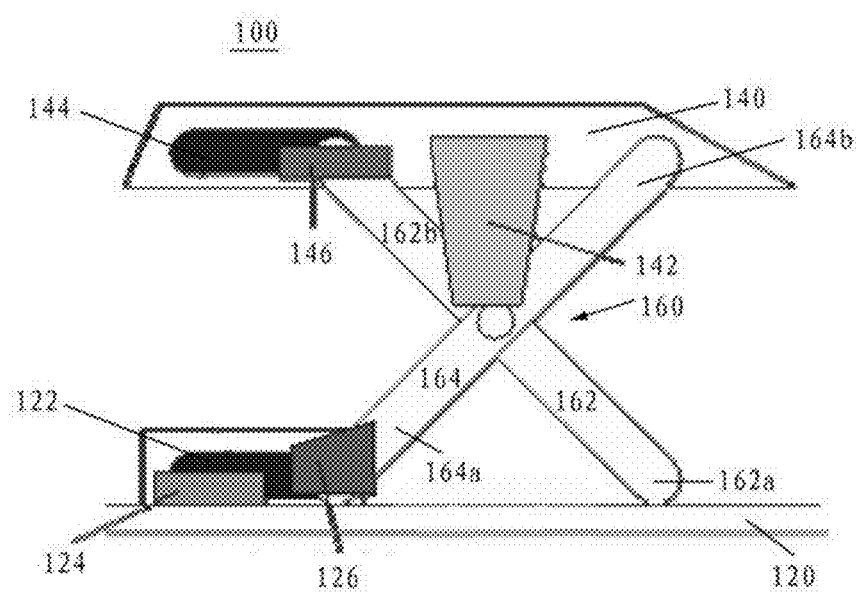
FIG. 2 is a schematic sectional view, showing a keyboard according to an exemplary embodiment of the present invention.

FIG. 2 shows a keyboard 100 according to an exemplary embodiment of the present invention. As shown in FIG. 2, the keyboard 100 comprises a base plate 120, a keycap 140 and an X-shaped holder 160. The X-shaped holder 160 may also be referred to as scissor legs (hereinafter may also be referred as a scissor holder), and comprises a first lever 162 and a second lever 164 which are pivotally connected to each other in an X shape. The X-shaped holder 160 supports the keycap 140 on the base plate 120 and is capable of shearing so that the keycap 140 may move up and down with respect to the base plate 120 between a higher first position and a lower second position. A circuit (not shown) may be disposed on the base plate 120. A contact pole 142 may be disposed on the keycap 140. When the keycap 140 moves downwards e.g. to the second position, the contact pole 142 contacts the circuit on the base plate 120, the key is triggered and the circuit sends a key value.

When the X-shaped holder 160 shears, the distance between upper two ends and that between the lower two ends thereof may change. In order to define a position of the X-shaped holder 160, one end, e.g. an end 162*a* of the first lever 162, is pivotably connected to the base plate 120 such that, when the keycap 140 moves up and down with respect to the base plate 120, one end 162*a* of the first lever 162 pivots while the other end 162*b* slides horizontally with respect to the keycap 140; and one end 164*a* of the second lever 164 slides horizontally with respect to the base plate 120 while the other end 164*b* of the second lever 164 slides horizontally or pivots with respect to the keycap 140, depending on whether the pivot joint of the X-shaped holder 160 is positioned at the center of the first lever 162 and the second lever 164. A first chute 144 may be disposed on the keycap 140, with the end 162*b* of the X-shaped holder 160 being coupled to the first chute 144 to slide therein. Similarly, a second chute 122 may be disposed on the base plate 120, the end 164*a* of the X-shaped holder 160 being coupled to the second chute 122 to slide therein. It shall be understood that the first chute 144 and the second chute 122 may not be necessary. The ends of the X-shaped holder 160 may be slidably connected to the keycap 140 and the base plate 120 in any other manner.

In the embodiment shown in FIG. 2, a first magnetic member 124 and a second magnetic member 126 may be disposed on the base plate 120, with the first magnetic member 124 disposed beside the second magnetic member 126. The first magnetic member 124 and the second magnetic member 126 may be fixedly disposed on the base plate 120. A third magnetic member 146 may be disposed on a sliding end of the X-shaped holder 160 (e.g. the sliding end 162*b*) at a side of the keycap 140. The third magnetic member 146 may be disposed directly on the end 162*b* or interlinkingly on the keycap 140 together with the end 162*b* so that the back-and-forth sliding of the end 162*b* may drive the third magnetic member 146 to slide. In an exemplary embodiment of the present invention, the first, second and third magnetic members 124, 126 and 146 may be permanent magnets.

When the keycap 140 is at the initial highest position, e.g. a first position, the third magnetic member 146 is in a position substantially opposite to the second magnetic member 126. The "substantially opposite to", as used herein, means that the third magnetic member 146 is not necessarily right opposite to the second magnetic member, but may be offset within a certain range, as long as the two members are substantially within the magnetic line intensive region of each other. It may be understood that the magnetic lines are most dense at the pole end of the magnet and reduce sharply as moving along either side. The third magnetic member 146 and the second magnetic member 126 are substantially opposite to each other so that the interactive magnetic force between them is stronger. In the exemplary embodiment shown in FIG. 2, the opposite ends of the third magnetic member 146 and the second magnetic member 126 have the same polarities, forming a strong repulsive force therebetween to support the keycap 140 in the first position.

Figure 3:
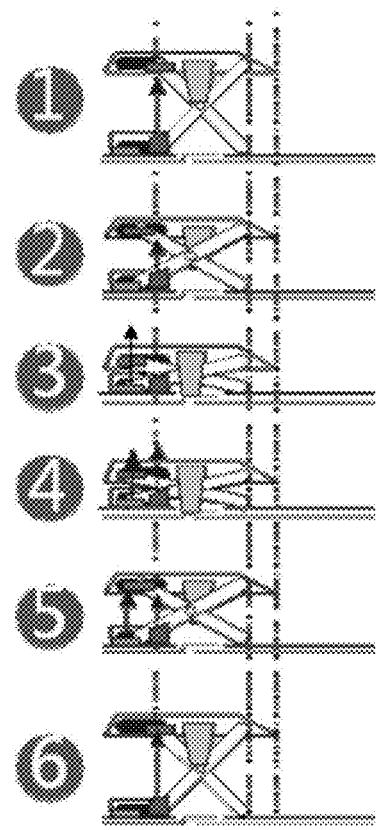
FIG. 3 is a schematic sectional view, showing an operation process of the keyboard of FIG. 2.

Now referring to FIG. 3, a key-press process of the keyboard 100 is described. The FIG. 3 shows six states during the key-press process. As shown in FIG. 3, in state 1, the keycap 140 is in an initial readiness position, e.g. the first position, and the third magnetic member 146 is substantially opposite to the second magnetic member 126, in which state the user needs a relatively large key-press force to overcome the repulsive magnetic force between the third magnetic member 146 and the second magnetic member 126 in order to press down the keycap 140.

When the keycap 140 starts to be pressed down, as shown in state 2, the X-shaped holder 160 shears so that the end 162*b* drives the third magnetic member 146 to slide along a direction substantially parallel to the base plate 120, whereby the third magnetic member 146 deviates from the position substantially opposite to the second magnetic member 126. As stated before, the magnetic field is greater at the pole ends of the magnet and weakens sharply in both side directions. So, the third magnetic member 146 gradually escapes from the magnetic line intensive region of the second magnetic member 126, during which process the repulsive magnetic force between the third magnetic member 146 and the second magnetic member 126 decreases gradually and the key-press force may reduce accordingly as well.

Next, as shown in state 3, the keycap 140 is further pressed down to reach the second position, e.g. the lowest position, during which process the third magnetic member 146 gradually enters a position opposite to the first magnetic member 124. Similarly, a repulsive magnetic force is generated between the first magnetic member 124 and the third magnetic member 146. Therefore, the upward force applied to the third magnetic member 146 increases rapidly, and so does the key-press force applied by the user. In this way, the user may sense that the keycap 140 has already been pressed down to the lowest position, thus release the key pressing finger. In the lowest position, the contact pole 142 contacts the circuit (now shown) formed on the base plate 120 so that the circuit sends out a key value, thus completing the key-press action.

After the user releases the finger, as shown in state 4, the keycap 140 moves upwards under the action of the repulsive magnetic force from the first magnetic member 124, so the third magnetic member 146 slides along a return path, gradually leaving the position opposite to the first magnetic member 124 (as shown in state 5) and entering into the position opposite to the second magnetic member 126. Finally the keycap 140 returns to the first position in a readiness state, as shown in state 6.

It can be seen from the above movement that the key-press force is greater at first, then reduces and again increases afterwards during the key-press process of the keyboard 100 due to the sliding of the third magnetic member 146. Therefore, the magnetic keyboard of the present invention, with a longer service life, can achieve the hand feel similar to that of the rubber pad keyboard.

Figure 1:
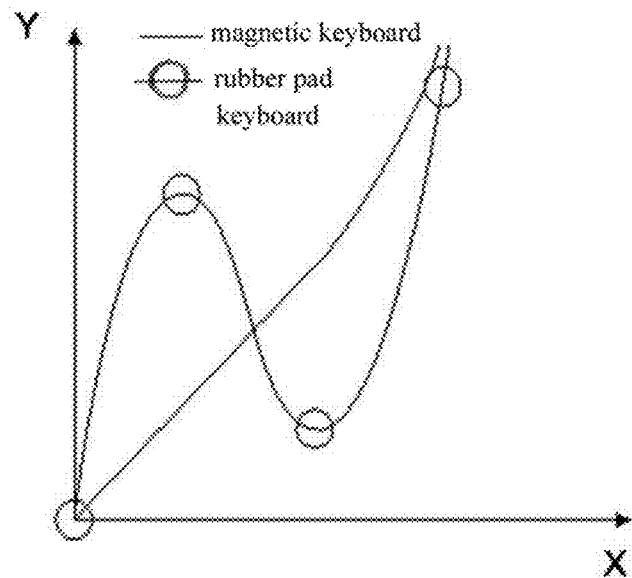
FIG. 1 is a curve graph, showing a curves representing the change of the key-press force as a function of the key-press stroke of a conventional rubber pad keyboard and a conventional magnetic keyboard.
Figure 4A:
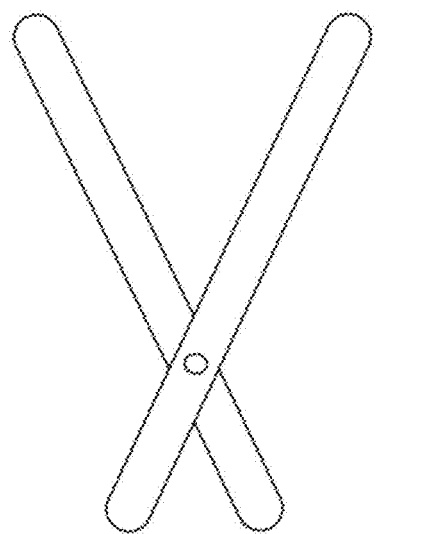
FIGS. 4A and 4B are schematic sectional views, showing an X-shaped holder of the keyboard of FIG. 2.
Figure 4B:
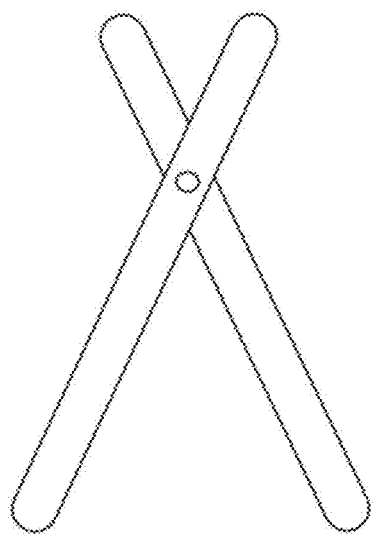

In the embodiment shown in FIG. 1, the pivot joint of the X-shaped holder 160 is positioned substantially at the center of the first lever 162 and the second lever 164. However, the present invention is not limited to this. As shown in FIGS. 4A and 4B, the pivot joint may be positioned at a lower position (FIG. 4A) or an upper position (FIG. 4B) on the first lever 162 and the second lever 164. As for the embodiment shown in FIG. 1 that the sliding magnetic member (i.e. the third magnetic member 146) is disposed on a side of the keycap 140, the X-shaped holder structure shown in FIG. 4A is advantageous because it provides a longer distance for sliding and brings flexibility to the structural design of the present invention. It can be easily understood that the X-shaped holder structure shown in FIG. 4B is preferable when the sliding magnetic member is disposed on a side of the base plate 120.

The exemplary embodiment of the present invention is described above in the case that the first, second and third magnetic members 124, 126 and 146 are permanent magnets. But it is understood for those skilled in the art that the present invention is not limited to this. For example, in another exemplary embodiment of the present invention, the first, second and third magnetic members 124, 126 and 146 may be electromagnets. When the first and second magnetic members 124 and 126 are electromagnets, it is easy to power them via the circuit formed on the base plate 120. Since the third magnetic member 146 is disposed on a side of the keycap, it requires a complex wiring to power it. In consideration of the influence of the key-press operation on the wiring, it is preferable that the third magnetic member 164 is a permanent magnet. Another exemplary embodiment of the present invention will be described herein in the case that the first and second magnetic members 124 and 126 are electromagnets while the third magnetic member 146 is a permanent magnet.

Figure 5:
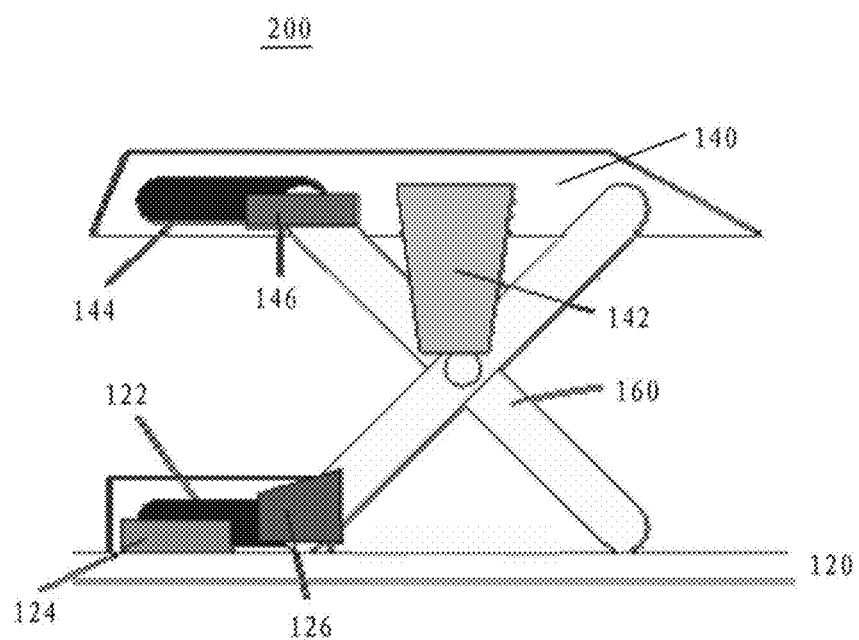
FIG. 5 is a schematic sectional view, showing a keyboard according to another exemplary embodiment of the present invention.

FIG. 5 shows a keyboard 200 according to another exemplary embodiment of the present invention, which is substantially same as the keyboard 100 shown in FIG. 1, except that the first and second magnetic members 124 and 126 are electromagnets. In addition, a circuit for powering the first and second magnetic members 124 and 126 may be formed on the base plate 120. The structure of the keyboard 200 will not be described in details herein.

When the keyboard 200 is actuated, power is supplied to the first magnetic member 124 and the second magnetic member 126 to generate a repulsive magnetic force against the third magnetic member 146, to keep the keycap 140 in its initial readiness position. The subsequent operations of keyboard 200 are substantially same to those of the keyboard 100 as described above.

Figure 6:
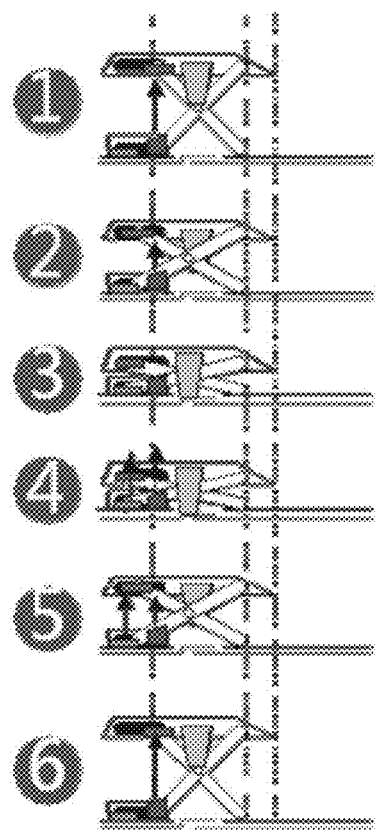
FIG. 6 shows an operation process of the keyboard of FIG. 5.

Alternatively, the keyboard 200 may be operated according to the following method shown in FIG. 6, which shows six states of the keyboard 200 during operation.

As shown in FIG. 6, state 1 shows that the keycap 140 is in the initial readiness position, e.g. the first position, and the third magnetic member 146 is substantially opposite to the second magnetic member 126 after the keyboard 200 is actuated, in which case power is supplied to the second magnetic member 126 to generate the magnetic force to support the keycap 140, while no power is supplied to the first magnetic member 124 so no magnetic force is generated. The user needs a greater key-press force to overcome the repulsive magnetic force between the third magnetic member 146 and the second magnetic member 126 in order to press down the keycap 140.

When the keycap 140 starts to be pressed down, as shown in state 2, the X-shaped holder 160 shears so that the end 162b drives the third magnetic member 146 to slide along a direction substantially parallel to the base plate 120, whereby the third magnetic member 146 deviates from the position substantially opposite to the second magnetic member 126. As stated above, the magnetic field is the greater at the pole end of the magnet and weakens sharply in both side directions. So, the third magnetic member 146 gradually escapes from the magnetic line intensive region of the second magnetic member 126, during which process the repulsive magnetic force between the third magnetic member 146 and the second magnetic member 126 decreases gradually and the key-press force may reduce accordingly as well.

Next, as shown in state 3, the keycap 140 is further pressed down to reach the second position, e.g. the lowest position, during which process the third magnetic member 146 gradually escapes from the magnetic action of the second magnetic member 126 and enters into a position opposite to the first magnetic member 124. It shall be noted that the first magnetic member 124 as an electromagnet does not generate magnetic field because no power is supplied before it reaches the second position. As stated above, the key is triggered and the circuit formed on the base plate 120 sends out a key value. Meanwhile, the circuit formed on the base plate 120 also powers the first magnetic member 124 so as to generate a repulsive magnetic force between the first magnetic member 124 and the third magnetic member 146. In this way, the upward force applied to the third magnetic member 146 increases rapidly. The user may sense the rapidly increasing force and realize that the keycap 140 has already been pressed down to the lowest position, thus releases the key pressing finger, thus completing the key-press action.

After the user releases the finger, as shown in state 4, the keycap 140 moves upwards under the action of the repulsive magnetic force from the first magnetic member 124, so the third magnetic member 146 slides along a return path, gradually leaving the position opposite to the first magnetic member 124 and entering into the position opposite to the second magnetic member 126, as shown in state 5. Finally the keycap 140 returns to the first position in a readiness state, as shown in state 6. At this time, the circuit stops powering the first magnetic member 124 and only powers the second magnetic member 126.

For the keyboard 200 shown in FIG. 5, no power is supplied to the first and the second magnetic member 124 and 126 any more on shutdown, while the keycap 140 automatically falls to the second position under the influence of gravity. Thus, the overall thickness of the keyboard 200 may be further reduced.

Or, in another embodiment, a reverse current pulse may be applied to the first and the second magnetic member 124 and 126 via the circuit on shutdown so that an attractive magnetic force is generated between them and the third magnetic member 146, attracting the keycap 140 to the second position. In this way, the overall thickness of the keyboard 200 may also be reduced.

The term "shutdown" refers to the shutdown of the electronic device using the keyboard, e.g. the laptop computer. When the electronic device using the keyboard is shut down, the keycap of the keyboard is in the second position. What needs to be explained is that the top surface of the keyboard (i.e. the top surfaces of all keycaps) is flush with the horizontal plane of the body where the keyboard resides. In other words, the top surface of the keyboard belongs to the same plane as the horizontal plane of the body where the keyboard resides. The body where the keyboard resides may be either a host part or a non-host part (e.g. docking station) of the electronic device using the keyboard.

Figure 7:
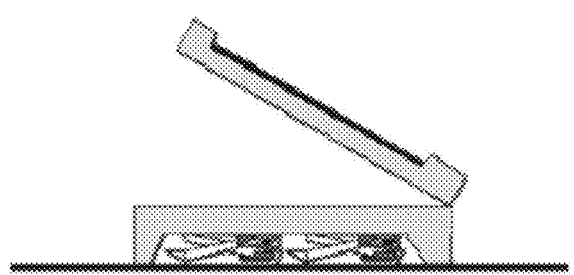
FIG. 7 shows a operation state of the keyboard according to an embodiment of the present invention.

Or, as shown in FIG. 7, when the display screen part of the notebook computer rotates beyond 180 degrees (e.g. 360 degrees) so that the keyboard part thereof is placed on the desk top facing downwardly, a current may be applied to the first and the second magnetic members 124 and 126 via the circuit on the base plate 120 to generate a magnetic force attracting the third magnetic member 146, such that the keycap 140 is in a position closest to the base plate 120 (i.e. the second position) and thus the overall thickness of the keyboard is reduced. At this time, the circuit on the base plate 120 controls the keyboard not to send out any key value. When the keycap of the keyboard is in the second position, the top surface of the keyboard (i.e. the top surfaces of all keycaps) is flush with the horizontal plane of the body of the keyboard part where the keyboard resides. In other words, the top surface of the keyboard belongs to the same plane as the horizontal plane of the body of the keyboard part.

It may be understood from the above embodiments that the first magnetic member 124 and the second magnetic member 126 may also be set as an electromagnet and a permanent magnet, or as a permanent magnet and an electromagnet. The specific operations are apparent from the above descriptions and will not be described in details herein.

The embodiment that the sliding magnetic member, i.e. the third magnetic member 146, is disposed on a side of the keycap 140 while the fixed magnetic members, i.e. the first and the second magnetic members 124 and 126, are disposed on a side of the base plate 120 is described above. But it is understood for those skilled in the art that the sliding magnetic member, i.e. the third magnetic member 146, may be disposed on a side of the base plate 120 while the fixed magnetic members, i.e. the first and the second magnetic members 124 and 126, are disposed on a side of the keycap 140. To be specific, the third magnetic member 146 is disposed on a sliding end of the X-shaped holder 160 on a side of the base plate 120. In such embodiment, the first and the second magnetic members 124 and 126 disposed on the keycap 140 may move up and down along with the keycap 140, while the third magnetic member 146 disposed on the sliding end of the X-shaped holder 160 may slide. Therefore, such magnetic keyboard may bring in improved hand feel. In consideration of the influence on the wiring as described above, it is preferable that the first, the second and the third magnetic members 124, 126 and 164 are permanent magnets. But, it is understood for those skilled in the art that the present invention is not limited to this.

A keyboard and an assembling method for the keyboard according to another embodiment of the present invention will be described below.

Figure 8:
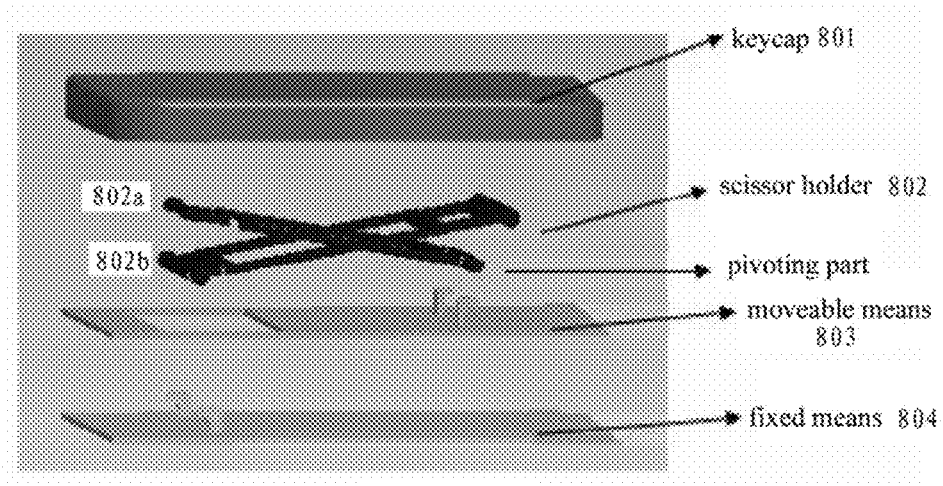
FIG. 8 shows a schematic exploded view of the keyboard according to the embodiments of the present invention.
Figure 9:
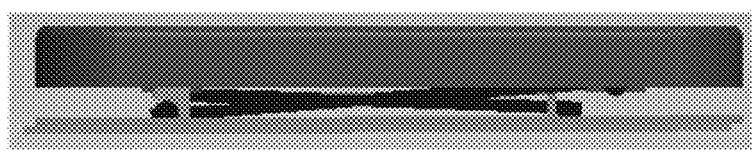
FIG. 9 shows a schematic view of the keyboard according to the embodiment of the present invention, with the keyboard in a compression state.
Figure 10:
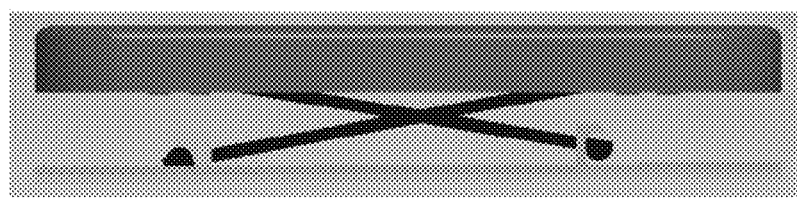
FIG. 10 shows a schematic view of the keyboard according to the embodiments of the present invention, with the keyboard in an operable readiness state.

Firstly, the structure of the keyboard according to the embodiment of the present invention is illustrated in conjunction with FIG. 8 to FIG. 10. FIG. 8 shows a schematic exploded view of the keyboard according to the embodiment of the present invention; FIG. 9 shows a schematic view of the keyboard according to the embodiment of the present invention in a compression state; and FIG. 10 shows a schematic view of the keyboard according to the embodiment of the present invention in an operable readiness state.

As shown in FIG. 8, a key of the keyboard comprises: a keycap 801; a scissor holder 802 supporting the keycap, the scissor holder 802 at least comprising a first member 802a at least having a first pivoting part and a second member 802b at least having a second pivoting part; a movable means 803 connected to the first pivoting part; and a fixed means 804 connected to the second pivoting part, wherein the movable means 803 moves to bring the first pivoting part away from or towards the second pivoting part.

Said scissor holder 802 may be realized by various existing structures, e.g. the first member 802a may be a first frame body, and the second member 802b may be a second frame body nested on the outer periphery of the first frame body. The specific structure of the scissor holder 802 does not constitute limitation to the present invention. In the illustration in FIG. 8, the first pivoting part at a lower end of the first member 802a is illustrated as a snap, which is mated with a snap on the movable means 803 for connection. Similarly, the second pivoting part at a lower end of the second member 802b is mated with a snap on the fixed means 804 for connection. But, said pivoting part may be any pivoting member and is not limited to a snap, as long as it can connect said scissor holder 802 with the corresponding moveable means 803 or the fixed means 804.

As shown in FIG. 8, the fixed means 804 is illustrated in the form of a plate, i.e. a fixed plate, and the movable means 803 is illustrated as a movable plate above the fixed plate. The movable plate is provided with for example a rectangular opening, through which the second member 802b of the scissor holder 802 penetrates to connect with the fixed plate. The movable plate may be realized in any other manner, e.g. having a length shorter than that of the fixed plate such that the movement of the fixed plate will not affect the connection between the second member 802b of the scissor holder 802 and the fixed plate. Alternatively, the fixed plate as the fixed means 804 may be disposed in the upper position, while the moveable plate as the moveable means 803 may be disposed in the lower position. In this case, said opening shall be provided on the fixed plate in the upper position, or the fixed plate in the upper position is shorter than the moveable plate in the lower position. In short, said fixed means 804 may be a fixed plate, said moveable means 803 may be a moveable plate located above or below the fixed plate, wherein the upper one of the fixed plate and the movable plate is shorter than the lower one or has an opening so as to allow the lower one to connect with the corresponding first pivoting part or second pivoting part. Said fixed plate and movable plate may be realized by the base plate of the keyboard.

As an alternative form, an accommodating groove may be disposed on the fixed means 804, and the movable means 803 is implemented as e.g. a pulley, the first pivoting part being moved away from or towards the second pivoting part by movement of the pulley in the accommodating groove, thus allowing the x-shaped holder 802 to open and close.

What needs to be explained is that the implementations of the fixed means 804 and the movable means 803 are not limited to the above illustration. All structures that allows the first pivoting part to be moved away from or towards the second pivoting part by the movement of the movable means 803 shall not be regarded as a departure from the spirit of the present invention.

With regard to the structure of the above keyboard, the movement of the movable means 803 moves the first pivoting part away from the second pivoting part when the keyboard is not in use, the height of the scissor holder 802 is reduced, the keycap is depressed, and thus the keyboard enters into the compression state as shown in FIG. 9. When the keyboard is in use, the movement of the movable means 803 moves the first pivoting part towards the second pivoting part, the height of the scissor holder 802 is increased, the keycap is moved upwards, and thus the keyboard enters into the readiness state as shown in FIG. 10. In the compression state as shown in FIG. 9, the object of being ultrathin is achieved by the reduced height of the keyboard; in the readiness state as shown in FIG. 10, the keyboard returns to its normal position to maintain the original function and good hand feel.

It shall be noted that, with respect to the keyboard having the scissor structure according to the embodiment of the present invention, the first member 802a or the second member 802b of the scissor holder 802 may correspondingly move relative to the keycap 801, or the pivot of the scissor holder 802 for connecting the first member 802a with the second member 802b may correspondingly move, in conjunction with the movement of the movable means 803. In addition, the other possible components of the keyboard structure are well known to those skilled in the art, thus being omitted herein for clarity.

The keyboard in the embodiment of the present invention is typically used for portable electronic devices such as portable computers, electronic dictionary devices and etc. Usually, the keyboard is in an operable readiness state when the screen of the portable electronic device is opened, while it is in a non-operable compression state when the screen of the portable electric device is closed. Based on this, the keyboard may be in the compression state or the readiness state in conjunction with the movement of the system. Specifically, the movable means 803 is interlinked with the movement of the screen of the electronic device, wherein the movable means 803 is driven to move by the movement of the screen so that the first pivoting part is moved towards or away from the second pivoting part. Typically, when the screen moves in a direction away from the keyboard, the first pivoting part moves towards to the second pivoting part, the keycap moves upwards so that the keyboard is in the operable readiness state; when the screen moves towards the keypad, the first pivoting part is moved away from the second pivoting part, the keycap is depressed so that keyboard is in the compression state. By interlinking the movable means 803 with the movement of the screen of the electronic device, the keyboard may be switched automatically between the compression state and the readiness state.

Alternatively, the state of the keyboard may be changed with the state of the electronic device according to different practical requirements. For example, the keyboard enters into the compression state when the electronic device is in a non-operating sleep or readiness mode; the keyboard enters into the readiness state when the electronic device is in an operating mode. With the teaching of the embodiment of the present invention, those skilled in the art are able to adjust the keyboard to the compression state or the readiness state according to different parameters of the electronic device.

In the above described embodiment of the present invention, by mounting the two members of the scissor holder respectively on two means (herein the movable means and the fixed means), the height of keyboard is changed with the movement of the movable means. When the keyboard is not in use, the keycap is depressed to compress the height of the keyboard, achieving the object of being ultrathin; when the keyboard is in the readiness state, the keycap moves upwards, back to the normal height, ensuring good hand feel of the keyboard. Therefore, the requirements of a thin keyboard and good hand feel are both satisfied while assuring the keyboard in normal operation.

Figure 11:
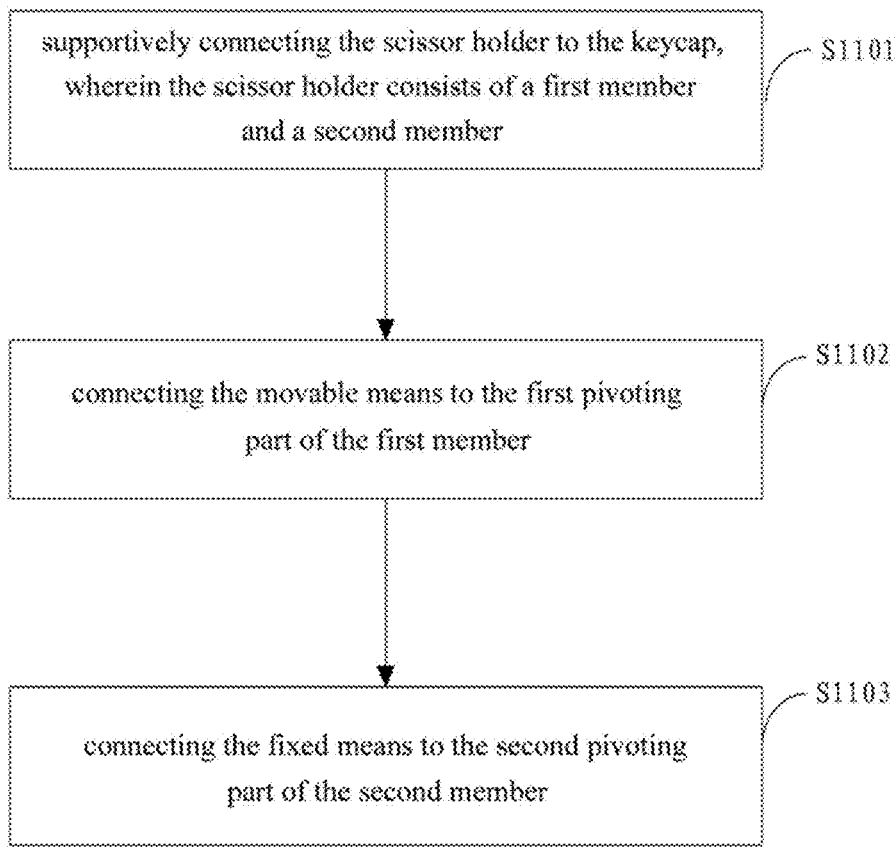
FIG. 11 is a flow chart illustrating the assembling process of the keyboard according to the embodiments of the present invention.

FIG. 11 is a flow chart 1100 illustrating the assembling method of the keyboard according to the embodiment of the present invention. The keyboard comprises a keycap; a scissor holder at least comprising a first member and a second member; a movable means; and a fixed means, wherein the first member at least has a first pivoting part and the second member at least has a second pivoting part. The method comprising the following steps:

Step S1101: supportively connecting the scissor holder to the keycap. As stated before, the scissor holder may be realized by various existing structures, and its specific structure does not constitute any limitation to the present invention. For example, the scissor holder may consist of a first frame body (i.e. the first member 802a) and a second frame body (i.e. the second member 802b) that is nested on the outer periphery of the first frame body. One end of the first member is connected to and thus supports the keycap and the other end thereof has a pivoting part that is connected to the movable means in the following manner. One end of the second member is also supportively connected to the keycap and the other end thereof is connected to the fixed means in the following manner via a pivoting part.

Step S1102: connecting the movable means to the first pivoting part. As shown in FIG. 8, the movable means 803 may be a movable plate located above the fixed means 804, the movable plate is either provided with an opening with for example a rectangular shape or any other shape, or having a length shorter than that of the fixed means in the lower position, so that the second member of the scissor holder 802 can be connected to the fixed means. The movable means is provided with a pivoting member mated with the pivoting part on the scissor holder, so that the second member 802b of the scissor holder 802 is mounted to the movable means 803 by connecting the movable means 803 to the first pivoting part. Alternatively, the movable means 803 may be implemented as e.g. a pulley, the first pivoting part being moved away from or towards the second pivoting part by movement of the pulley on the fixed means 804, thus allowing the scissor holder 802 to open and close.

Step S1103: connecting the fixed means to the second pivoting part. As described above, the fixed means 804 may be a fixed plate located above or below the movable means. When the fixed means is located above the movable means, the fixed plate is either provided with an opening or having a length shorter than that of the movable means in the lower position, so that the first member of the scissor holder 802 can be connected to the fixed means. When the movable means 803 is implemented as a pulley, the fixed means is provided with an accommodating groove in which the pulley moves, thus allowing the scissor holder 802 to open and close.

It shall be noted that, in the keyboard assembled according to the above assembling method, the first member or the second member of the scissor holder may correspondingly move relative to the keycap 801, or the pivot of the scissor holder 802 for connecting the first member with the second member may correspondingly move, in conjunction with the movement of the movable means.

In the keyboard assembled by the above assembling method, the movement of the movable means moves the first pivoting part away from or towards the second pivoting part. When the keyboard is not in use, the movement of the movable means moves the first pivoting part away from the second pivoting part, the height of the scissor holder is reduced, the keycap is depressed, and thus the keyboard enters into the compression state as shown in FIG. 9. When the keyboard is in use, the movement of the movable means moves the first pivoting part towards the second pivoting part, the height of the scissor holder 802 is increased, the keycap moves upwards, and thus the keyboard enters into the readiness state as shown in FIG. 10. In the compression state of the keyboard, the object of being ultrathin is achieved by the reduced height of keyboard; in the readiness state of the keyboard, the keyboard returns to its normal position to maintain the original function and good hand feel.

As stated above, the movable means may be interlinked with the movement of the screen of the electronic device, wherein the movable means 803 is driven to move by the movement of the screen so that the first pivoting part is moved towards or away from the second pivoting part. For example, when the screen moves in a direction away from the keyboard, the first pivoting part moves towards the second pivoting part, the keycap moves upwards so that the keyboard is in the operable readiness state; when the screen moves towards the keypad, the first pivoting part is moved away from the second pivoting part, the keycap is depressed so that keyboard is in the compression state. By interlinking the movable means with the movement of the screen of the electronic device, the keyboard may be switched automatically between the compression state and the readiness state. Alternatively, the keyboard may be adjusted to the compression state or the readiness state according to different parameters of the electronic device. For example, when the electronic device is in a non-operating state, the keyboard enters into the compression state; when the electronic device is in an operating state, the keyboard enters into the readiness state. With the teaching of the embodiment of the present invention, those skilled in the art are able to make suitable changes according to practical requirements to realize the movement of the movable means and interlinking between the movable means and the screen or the state of the electronic device by means of software and necessary hardware platform.

In the method of assembling the keyboard according to the embodiment of the present invention, by mounting the two members of the scissor holder respectively on the movable means and the fixed means, the height of keyboard is changed with the movement of the movable means. When the keyboard is not in use, the keycap is depressed to compress the height of the keyboard, achieving the object of being ultrathin; when the keyboard is in the readiness state, the keycap moves upwards, back to the normal height, ensuring good hand feel of using the keyboard. Therefore, the keyboard assembled using said assembling method satisfies both requirements of a thin keyboard and good hand feel.

Although the illustrative embodiments of the present invention have been particularly shown and described herein with reference to the accompanying drawings, it is to be understood by those skilled in the art that the present invention is not limited to those described embodiments, and that various changes and modifications may be effected in forms and details without departing from the spirit and scope of the present invention.

What is claimed is:

1. A magnetic keyboard, comprising:
   a base plate, on which a first magnetic member and a second magnetic member are formed;
   a keycap, disposed above the base plate; and
   an X-shaped holder, disposed between the base plate and the keycap for supporting the keycap, the X-shaped holder comprising a first lever and a second lever pivotally connected to each other, thus having four ends, wherein one end is pivotally connected to the base plate, one end is slidably connected to the keycap in a sliding direction substantially parallel to the base plate, and a third permanent magnet is provided on the sliding end,
   wherein the keycap is movable between a first position and a second position lower than the first position along a direction substantially perpendicular to the base plate, and
   wherein the third permanent magnet is in a position substantially opposite to the second magnetic member when the keycap is in the first position, and the third permanent magnet slides to a position substantially opposite to the first magnetic member when the keycap is in the second position.

2. The magnetic keyboard according to claim 1, wherein the first magnetic member and the second magnetic member are respectively a first permanent magnet and a second permanent magnet, and a lower surface of the third permanent magnet has the same polarity as those of the upper surfaces of the first permanent magnet and the second permanent magnet.

3. The magnetic keyboard according to claim 1, wherein the first magnetic member and the second magnetic member are respectively a first electromagnet and a second electromagnet.

4. The magnetic keyboard according to claim 3, wherein a contact pole facing the base plate is formed on the keycap, wherein a circuit is formed on the base plate, and wherein the contact pole contacts the circuit when the keycap is in the second position so that the circuit sends out a key value while powering the first electromagnet.

5. The magnetic keyboard according to claim 1, wherein the first magnetic member and the second magnetic member are respectively a first electromagnet and a second permanent magnet, and a lower surface of the third permanent magnet has the same polarity as that of the upper surface of the second permanent magnet.

6. The magnetic keyboard according to claim 1, wherein a first chute is formed on the keycap, in which the sliding end of the X-shaped holder is assembled.

7. A magnetic keyboard, comprising:
   a base plate;
   a keycap, disposed above the base plate and having a first permanent magnet and a second permanent magnet; and
   an X-shaped holder, disposed between the base plate and the keycap for supporting the keycap, the X-shaped holder comprising a first lever and a second lever pivotally connected to each other, thus having four ends, wherein one end is pivotally connected to the base plate, one end is slidably connected to the base plate in a sliding direction substantially parallel to the base plate, and a third permanent magnet is provided on the sliding end, an upper surface of the third permanent magnet having the same polarity as those of the lower surfaces of the first permanent magnet and the second permanent magnet, wherein the keycap is movable between a first position and a second position lower than the first position along a direction substantially perpendicular to the base plate, and wherein the third permanent magnet is in a position substantially opposite to the second permanent magnet when the keycap is in the first position, and the third permanent magnet slides to a position substantially opposite to the first permanent magnet when the keycap is in the second position.

8. A driving method of a magnetic keyboard, the magnetic keyboard comprising a base plate, a keycap, and an X-shaped holder supporting the keycap to the base plate, one end of the X-shaped holder being slidably connected to the keycap, a first electromagnet and a second magnetic member being provided on the base plate, a third permanent magnet being provided on a sliding end of the X-shaped holder and sliding from a position substantially opposite to the second magnetic member to a position substantially opposite to the first electromagnet in response to the depressing operation of the keycap, the driving method comprising:

sending out a key value when the keycap is depressed to the lowest position, and at the same time applying a current pulse to the first electromagnet so as to generate a repulsive magnetic force between the first electromagnet and the third permanent magnet.

9. The driving method according to claim 8, further comprising:

applying a current pulse to the first electromagnet when the magnetic keyboard is actuated, such that the first electromagnet generates a repulsive magnetic force against the third permanent magnet.

10. The driving method according to claim 8, wherein the second magnetic member is a second electromagnet and the driving method further comprises:

powering the second electromagnet when the magnetic keyboard is actuated so as to generate a repulsive magnetic force of mutual against the third permanent magnet.

11. The driving method according to claim 10, further comprising:

applying a reverse current pulse to the first and the second electromagnets when the magnetic keyboard is shut down, such that the keycap is disposed at the lowest position by the repulsive magnetic force.

12. The driving method according to claim 8, wherein the second magnetic member is a second permanent magnet and is arranged to generate a repulsive magnetic force against the third permanent magnet.

13. An electronic device, comprising:

a keyboard, sending out a key value in response to a keypress operation;

a processing unit, receiving and handling the key value sent out by the keyboard; and a display unit, displaying a process result of the processing unit, wherein the keyboard comprises:

a base plate, on which a first magnetic member and a second magnetic member are formed;

a keycap, disposed above the base plate; and an X-shaped holder disposed between the base plate and the keycap for supporting the keycap, the X-shaped holder comprising a first lever and a second lever pivotally connected to each other, thus having four ends, wherein one end is pivotally connected to the base plate, one end is slidably connected to the keycap in a sliding direction substantially parallel to the base plate, and a third permanent magnet is provided on the sliding end, wherein the keycap is movable between a first position and a second position lower than the first position along a direction substantially perpendicular to the base plate, and wherein the third permanent magnet is in a position substantially opposite to the second magnetic member when the keycap is in the first position, and the third permanent magnet slides to a position substantially opposite to the first magnetic member when the keycap is in the second position.

14. A keyboard, comprising:

a keycap;

an X-shaped holder for supporting the keycap, the X-shaped holder at least comprising a first member at least having a first pivoting part and a second member at least having a second pivoting part;

a movable means connected to the first pivoting part; and a fixed means connected to the second pivoting part, wherein the movable means moves to bring the first pivoting part away from or towards the second pivoting part.

15. The keyboard according to claim 14, wherein the movable means is interlinked with a movement of a screen of the electronic device, such that the first pivoting part moves towards or away from the second pivoting part when the screen moves.

16. The keyboard according to claim 15, wherein the first pivoting part moves towards the second pivoting part when the screen moves away from the keyboard;

the first pivoting part is away from the second pivoting part when the screen moves towards the keyboard.

17. The keyboard according to claim 14, wherein, when the first pivoting part is away from the second pivoting part, the keycap is depressed so that the keyboard enters into a compression state; and when the first pivoting part is close to the second pivoting part, the keycap is moves upward so that the keyboard is in an operable readiness state.

18. The keyboard according to claim 14, wherein the fixed means is a fixed plate, the movable means is a movable plate located above or below the fixed plate, and the upper one of the fixed plate and the movable plate is shorter than the lower one or has an opening so as to allow the lower one to connect with the corresponding first pivoting part or second pivoting part.

19. The keyboard according to claim 14, wherein the fixed means comprises an accommodating groove, in which the movable means moves.

20. The keyboard according to claim 14, wherein the X-shaped holder further comprises a pivot, wherein the pivot moves or the first member or the second member of the X-shaped holder moves with respect to the keycap when the movable means moves.

21. An assembling method of a keyboard, the keyboard comprising: a keycap; an X-shaped holder at least comprising a first member and a second member; a movable means; and a fixed means, wherein the first member at least has a first pivoting part and the second member at least has a second pivoting part, the method comprising:

supportively connecting the X-shaped holder to the keycap;

connecting the movable means to the first pivoting part;

connecting the fixed means to the second pivoting part;

wherein the movable means moves to bring the first pivoting part away from or towards the second pivoting part.

22. The assembling method according to claim 21, wherein the fixed means comprises an accommodating groove and the assembling method further comprises allowing the movable means to move in the accommodating groove.

* * * * *